United States Patent
Scott

[11] Patent Number: 5,813,354
[45] Date of Patent: Sep. 29, 1998

[54] VEHICLE SEATBACK TRAY ASSEMBLY

[76] Inventor: Richard H. Scott, 6516 Heritage Trace Ct., Mobile, Ala. 36695

[21] Appl. No.: 992,703

[22] Filed: Dec. 17, 1997

[51] Int. Cl.$^6$ .................................................... A47B 23/00
[52] U.S. Cl. ............................................. 108/44; 297/146
[58] Field of Search ................................ 108/44, 45, 152, 108/115, 1; 297/188.07, 188.04, 163, 146, 135; 312/235.8, 235.2, 313, 223.5; 224/275, 282, 553, 564

[56] References Cited

U.S. PATENT DOCUMENTS

| | | |
|---|---|---|
| 2,202,744 | 5/1940 | Motz . |
| 2,619,395 | 11/1952 | Kent . |
| 3,217,154 | 11/1965 | Owen . |
| 4,265,447 | 5/1981 | Shafer .................................. 108/44 X |
| 4,449,750 | 5/1984 | Pultman ................................ 108/44 X |
| 4,501,457 | 2/1985 | Pond .................................... 108/44 X |
| 5,046,433 | 9/1991 | Kramer et al. ............................ 108/44 |
| 5,188,421 | 2/1993 | Arseneault ............................ 108/44 X |
| 5,197,381 | 3/1993 | Mells ........................................ 108/44 |
| 5,269,229 | 12/1993 | Akapatangkul ............................ 108/44 |
| 5,370,060 | 12/1994 | Wang ........................................ 108/44 |
| 5,443,018 | 8/1995 | Cromwell .................................. 108/44 |

FOREIGN PATENT DOCUMENTS 1122364  8/1968  United Kingdom ..................... 108/44

*Primary Examiner*—Jose V. Chen
*Attorney, Agent, or Firm*—Joseph N. Breaux

[57] ABSTRACT

A vehicle seatback tray assembly that includes a main tray assembly; a two-sided, two-way pivoting mirror assembly; two user formable, upper attachment hooks; and two adjustable length lower securing strap assemblies. The main tray assembly includes a main housing, a pivoting tray member and a tray member angular adjustment mechanism. The main housing includes a forward storage tray, a main housing compartment, a light compartment for housing a light bulb socket, and a light bulb socket controlling on/off switch. The pivoting tray member is pivotally connected to the main housing and includes a light opening that pivots over the light compartment of the main housing when the pivoting tray member is pivoted into a closed position blocking. The angular adjustment mechanism includes a curved locking bar and a locking pin assembly. The two-sided, two-way pivoting mirror assembly is positioned within the main housing compartment and includes a two-sided mirror, a first and a second pivot bar, a first and a second pivoting strip connector, and first and second pull straps.

16 Claims, 4 Drawing Sheets

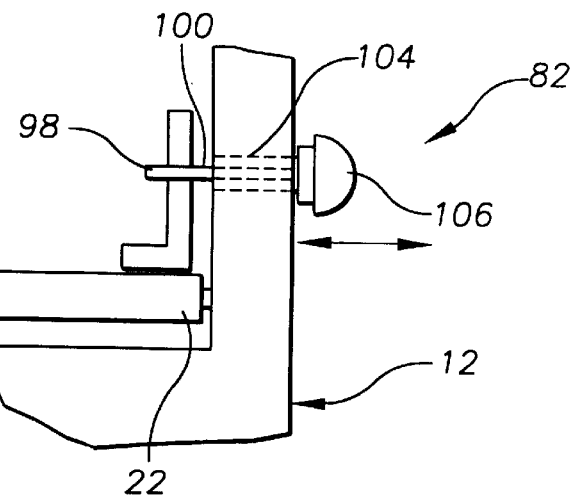
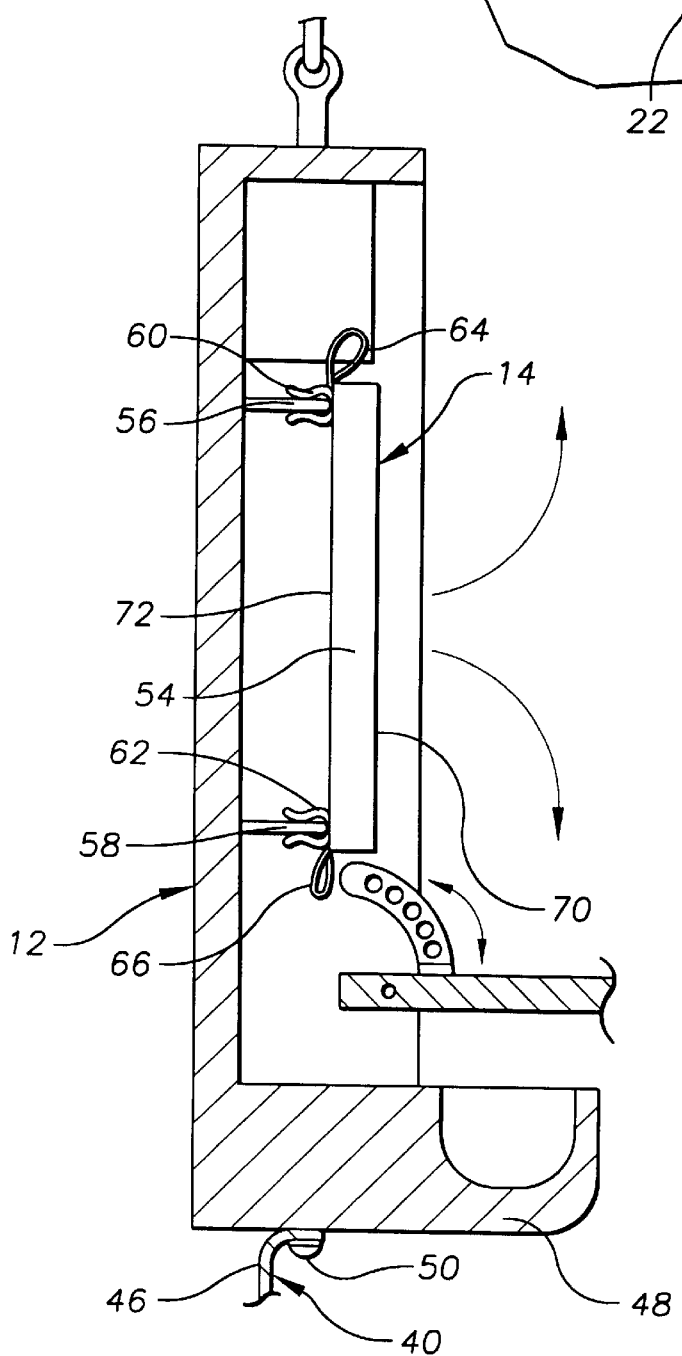

VEHICLE SEATBACK TRAY ASSEMBLY

TECHNICAL FIELD

The present invention relates to collapsible trays and the like and more particularly to a vehicle seatback tray assembly that includes a main tray assembly, a two-sided, two-way pivoting mirror assembly, two user formable, upper attachment hooks, and two adjustable length lower securing strap assemblies; the main tray assembly including a main housing, a pivoting tray member and a tray member angular adjustment mechanism; the main housing including a forward storage tray, a main housing compartment, a light compartment for housing a light bulb socket, and a light bulb socket controlling on/off switch; the pivoting tray member being pivotally connected to the main housing and including a light opening that pivots over the light compartment of the main housing when the pivoting tray member is pivoted into a closed position blocking access into the main housing compartment; the angular adjustment mechanism including a curved locking bar and a locking pin assembly; the curved locking bar having a base portion secured to the tray member and a curved portion extending away from the pivoting tray member that has a number of spaced locking apertures provided therethrough; the locking pin assembly including a locking pin shaft positioned through the sidewall aperture of the main housing that is concentrically alignable with each of the locking apertures by pivoting the pivoting tray member and a locking pin knob that is attached to an end of the locking pin shaft and positioned exteriorly of the main housing compartment; the two-sided, two-way pivoting mirror assembly being positioned within the main housing compartment and including a two-sided mirror, a first and a second pivot bar, a first and a second pivoting strip connector, and first and second pull straps; the first and the second pivot bar each being U-shaped and secured at the ends of thereof to a main housing compartment defining wall of the main housing; the first and second pivoting strip connectors each being permanently secured to an inwardly directed mirror surface of the two-sided mirror and each including a pivot bar insertion opening along the entire length thereof that is defined between two resilient wall sections that further define a resilient pivot bar gripping structure; the first and second pivoting strip connectors being spaced apart a distance sufficient to allow the first pivot are to be positioned within the resilient pivot bar gripping structure of the first pivoting strip connector while the second pivot bar is positioned within the resilient pivot bar gripping structure of the second pivoting strip connector; each of the resilient pivot bar gripping structures having sufficient gripping strength against a respective pivot bar to independently hold the two-sided mirror in a user set pivot position; the two user formable, upper attachment hooks each being constructed from a user bendable metal strip and secured to the main tray assembly with a securing eye-bolt; the two adjustable length lower securing strap assemblies each including an adjustable length strap provided with an underseat attachment hook at one end thereof and permanently attached to the underside of the main housing at a second strap end thereof.

BACKGROUND ART

It is often desirable to have a working surface, such as a tray, for supporting items in front of a passenger seated in the back passenger compartment of a vehicle. Because the back passenger compartments of vehicles are typically cramped, it would be a benefit if the tray could be stored in an upright position when not needed to reduce the space requirements for storing the tray. In addition, because it is often desirable to use the tray for supporting make-up and the like, it would be a further benefit if the tray were part of a tray assembly that included a mirror and a light source. In addition, because the tray assembly would be advantageously attached to the seatback of one of the front vehicle seats, it would be a further benefit if the tray assembly included a pair of user formable attachment hooks that were shapable by the user to allow attachment of the tray assembly to a variety of types of vehicle seatbacks. Because the seatback of the any particular front seat of a vehicle is often oriented at an angle selected by the current front seat occupant, it would be further desirable if the tray member of the tray assembly could be positioned and locked at a number of user selected angles with respect to the seatback to allow a user to compensate when the seatback is moved to a different angle by a front seat passenger. In addition, it would of course be a further benefit if the mirror were also positionable by a user to compensate for the angle of a particular seatback.

GENERAL SUMMARY DISCUSSION OF INVENTION

It is thus an object of the invention to provide a vehicle seatback tray assembly.

It is a further object of the invention to provide a vehicle seatback tray assembly that includes a tray member that is storable in an upright position.

It is a still further object of the invention to provide a vehicle seatback tray assembly that includes a user positionable mirror and a light source.

It is a still further object of the invention to provide a vehicle seatback tray assembly that includes a pivoting tray member that is lockable at a variety of user selected angles.

It is a still further object of the invention to provide a vehicle seatback tray assembly that includes a main tray assembly, a two-sided, two-way pivoting mirror assembly, two user formable, upper attachment hooks, and two adjustable length lower securing strap assemblies.

It is a still further object of the invention to provide a vehicle seatback tray assembly that includes a main tray assembly, a two-sided, two-way pivoting mirror assembly, two user formable, upper attachment hooks, and two adjustable length lower securing strap assemblies; the main tray assembly including a main housing, a pivoting tray member and a tray member angular adjustment mechanism; the main housing including a forward storage tray, a main housing compartment, a light compartment for housing a light bulb socket, and a light bulb socket controlling on/off switch; the pivoting tray member being pivotally connected to the main housing and including a light opening that pivots over the light compartment of the main housing when the pivoting tray member is pivoted into a closed position blocking access into the main housing compartment; the angular adjustment mechanism including a curved locking bar and a locking pin assembly; the curved locking bar having a base portion secured to the tray member and a curved portion extending away from the pivoting tray member that has a number of spaced locking apertures provided therethrough; the locking pin assembly including a locking pin shaft positioned through the sidewall aperture of the main housing that is concentrically alignable with each of the locking apertures by pivoting the pivoting tray member and a locking pin knob that is attached to an end of the locking pin shaft and positioned exteriorly of the main housing compartment; the two-sided, two-way pivoting mirror assembly being positioned within the main housing compartment and including a two-sided mirror, a first and a second pivot bar, a first and a second pivoting strip connector, and first and second pull straps; the first and the second pivot bar each being U-shaped and secured at the ends of thereof to a main housing compartment defining wall of the main housing; the first and second pivoting strip connectors each being permanently secured to an inwardly directed mirror surface of the two-sided mirror and each including a pivot bar insertion opening along the entire length thereof that is defined between two resilient wall sections that further define a resilient pivot bar gripping structure; the first and second pivoting strip connectors being spaced apart a distance sufficient to allow the first pivot bar to be positioned within the resilient pivot bar gripping structure of the first pivoting strip connector while the second pivot bar is positioned within the resilient pivot bar gripping structure of the second pivoting strip connector; each of the resilient pivot bar gripping structures having sufficient gripping strength against a respective pivot bar to independently hold the two-sided mirror in a user set pivot position; the two user formable, upper attachment hooks each being constructed from a user bendable metal strip and secured to the main tray assembly with a securing eye-bolt; the two adjustable length lower securing strap assemblies each including an adjustable length strap provided with an underseat attachment hook at one end thereof and permanently attached to the underside of the main housing at a second strap end thereof.

It is a still further object of the invention to provide a vehicle seatback tray assembly that accomplishes some or all of the above objects in combination.

Accordingly, a vehicle seatback tray assembly is provided. The vehicle seatback tray assembly includes a main tray assembly, a two-sided, two-way pivoting mirror assembly, two user formable, upper attachment hooks, and two adjustable length lower securing strap assemblies; the main tray assembly including a main housing, a pivoting tray member and a tray member angular adjustment mechanism; the main housing including a forward storage tray, a main housing compartment, a light compartment for housing a light bulb socket, and a light bulb socket controlling on/off switch; the pivoting tray member being pivotally connected to the main housing and including a light opening that pivots over the light compartment of the main housing when the pivoting tray member is pivoted into a closed position blocking access into the main housing compartment; the angular adjustment mechanism including a curved locking bar and a locking pin assembly; the curved locking bar having a base portion secured to the tray member and a curved portion extending away from the pivoting tray member that has a number of spaced locking apertures provided therethrough; the locking pin assembly including a locking pin shaft positioned through the sidewall aperture of the main housing that is concentrically alignable with each of the locking apertures by pivoting the pivoting tray member and a locking pin knob that is attached to an end of the locking pin shaft and positioned exteriorly of the main housing compartment; the two-sided, two-way pivoting mirror assembly being positioned within the main housing compartment and including a two-sided mirror, a first and a second pivot bar, a first and a second pivoting strip connector, and first and second pull straps; the first and the second pivot bar each being U-shaped and secured at the ends of thereof to a main housing compartment defining wall of the main housing; the first and second pivoting strip connectors each being permanently secured to an inwardly directed mirror surface of the two-sided mirror and each including a pivot bar insertion opening along the entire length thereof that is defined between two resilient wall sections that further define a resilient pivot bar gripping structure; the first and second pivoting strip connectors being spaced apart a distance sufficient to allow the first pivot bar to be positioned within the resilient pivot bar gripping structure of the first pivoting strip connector while the second pivot bar is positioned within the resilient pivot bar gripping structure of the second pivoting strip connector; each of the resilient pivot bar gripping structures having sufficient gripping strength against a respective pivot bar to independently hold the two-sided mirror in a user set pivot position; the two user formable, upper attachment hooks each being constructed from a user bendable metal strip and secured to the main tray assembly with a securing eye-bolt; the two adjustable length lower securing strap assemblies each including an adjustable length strap provided with an underseat attachment hook at one end thereof and permanently attached to the underside of the main housing at a second strap end thereof. The main housing and the pivoting tray member are preferably constructed of molded plastic.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 3 is a cross sectional side view of the exemplary main tray assembly of the vehicle seatback tray assembly of FIG. 2 along the line I—I showing one of the two user formable, upper attachment hooks secured to the main housing of the main tray assembly with one of the securing eye-bolts; the adjustable length strap of one of the adjustable length lower securing strap assemblies riveted to the underside of the main housing; the curved locking bar of the tray member angular adjustment mechanism extending from the tray member; and the first and second pivot bars, the first and second pivoting strip connectors permanently secured to the inwardly directed mirror surface of the two-sided mirror, the firs and second pull straps and the two-sided mirror of the two-side, two-way pivoting mirror assembly.

FIG. 6 is a front detail view of the tray member angular adjustment mechanism showing the curved locking bar secured to the pivoting tray member, the tray member pivot pin extending from a side edge of the pivoting tray member and into the main housing; and the locking pin assembly with the locking pin shaft positioned through the sidewall of the main housing and one of the locking apertures of the curved locking bar and the locking pin knob positioned exteriorly of the main housing compartment.

EXEMPLARY MODE FOR CARRYING OUT THE INVENTION

Figure 1:
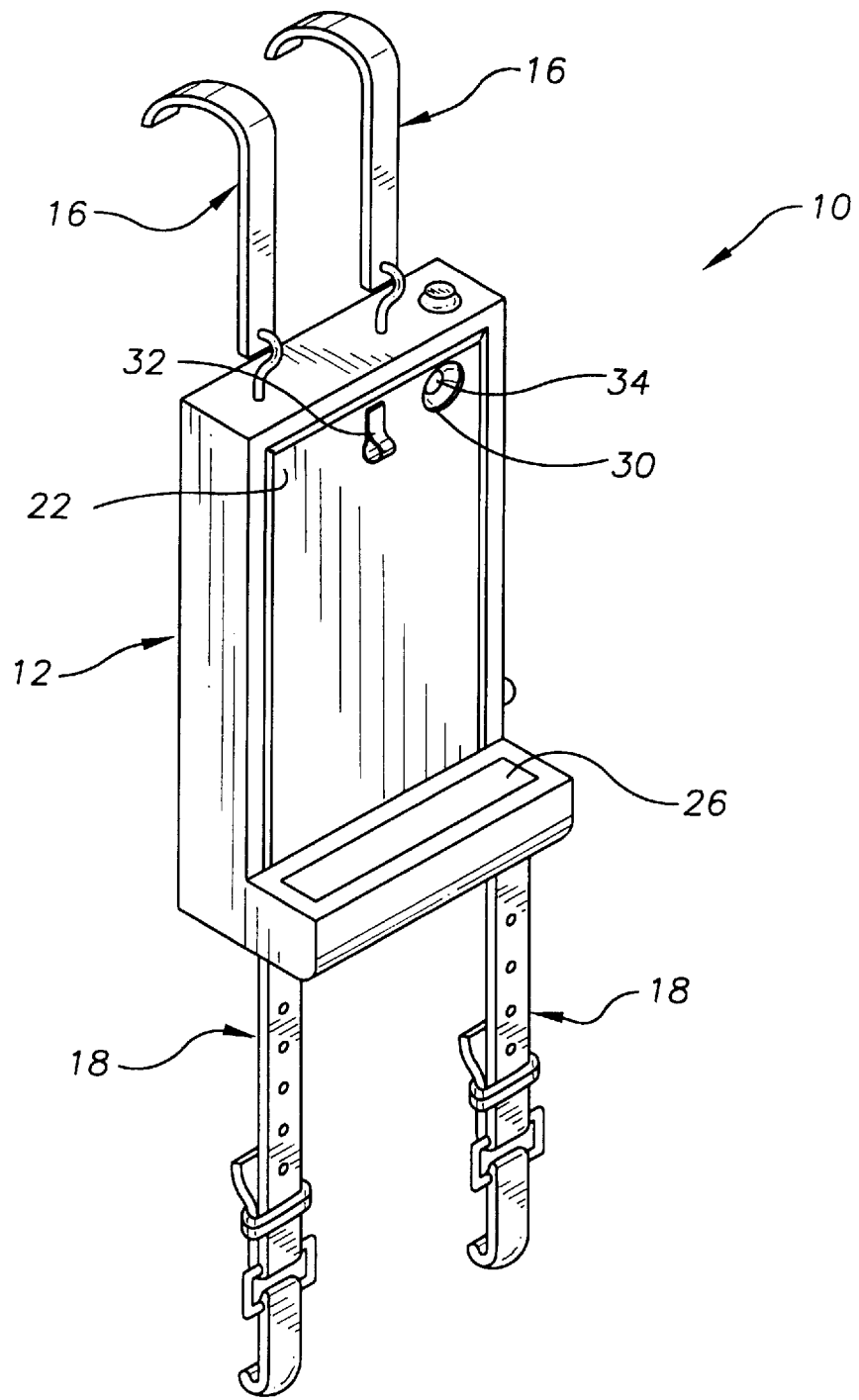
FIG. 1 is a perspective view of an exemplary embodiment of the vehicle seatback tray assembly of the present invention showing the main tray assembly including the main housing with the forward storage tray and the pivoting tray member with the light opening and the handle strap; the two user formable, upper attachment hooks that are each secured to the main tray assembly with a securing eye-bolt; and the two adjustable length lower securing strap assemblies each including an underseat attachment hook.

FIG. 1 shows an exemplary embodiment of the vehicle seatback tray assembly of the present invention generally designated by the numeral 10. Vehicle seatback tray assembly 10 includes a main tray assembly, generally designated 12; a two-sided, two-way pivoting mirror assembly, generally designated 14 (FIG. 2); two user formable, upper attachment hooks, each generally designated 16; and two adjustable length lower securing strap assemblies, each generally designated 18.

Figure 2:
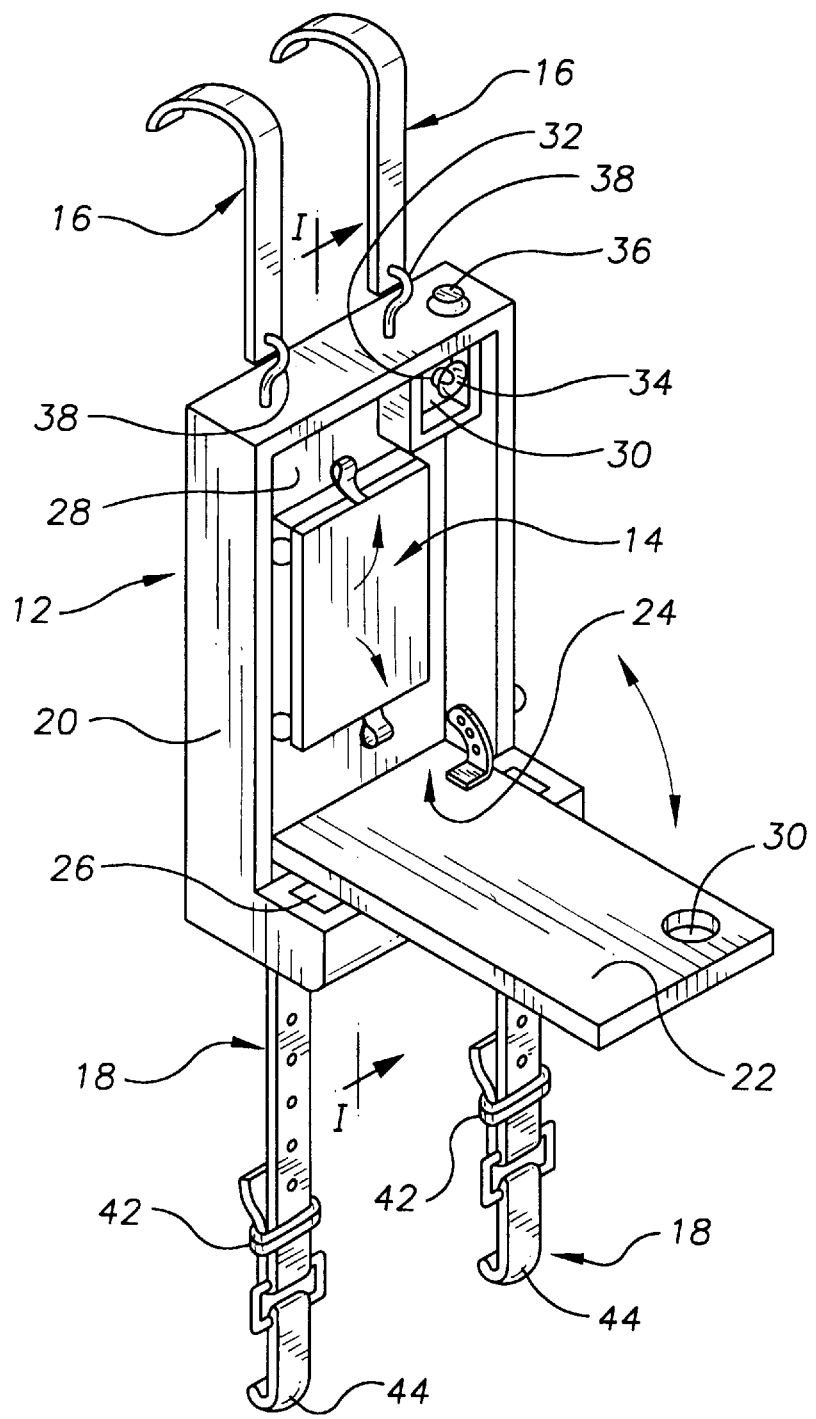
FIG. 2 is a second perspective view of the exemplary embodiment of the vehicle seatback tray assembly of FIG. 1 showing the pivoting tray member pivoted down to a desired horizontal use position; the tray member angular adjustment mechanism connected between the tray member and the main housing holding the pivoting tray member at the desired use position; the main housing compartment; the two-sided, two-way pivoting mirror assembly positioned within the main housing compartment; the light compartment including the light bulb; and the light bulb on/off switch.

With reference to FIG. 2, main tray assembly 12 includes a molded plastic main housing 20, a pivoting tray member 22, and a tray member angular adjustment mechanism, generally designated 24, connected between tray member 22 and main housing 20. Main housing 20 is constructed of molded plastic and includes a forward storage tray 26 (more clearly shown in FIG. 1), a main housing compartment 28, a light compartment 30 including a light bulb socket 32 for holding a light bulb 34; and a light bulb socket controlling on/off switch 36. Pivoting tray member 14 is of molded plastic construction and is pivotally connected to main housing 12 in a manner to pivot into a closed position blocking access into main compartment 28. Pivoting tray member 22 has a circular light opening 30 and a handle strap 32 (FIG. 1). With reference back to FIG. 1, circular light opening 30 is positioned over light bulb 34 when pivoting tray member 22 is pivoted into the closed position and, referring back to FIG. 2, functions as a cupholder when tray member 22 is pivoted into an open position.

In this embodiment each of the two user formable, upper attachment hooks 16 is a strip of bendable steel sheeting that is secured at one end to main housing 12 with a securing eye-bolt 38. Each of the adjustable length lower securing strap assemblies 18 are of identical construction and includes an adjustable length nylon strap 40 having an adjustment buckle 42 and an underseat attachment hook 44.

Figure 4:
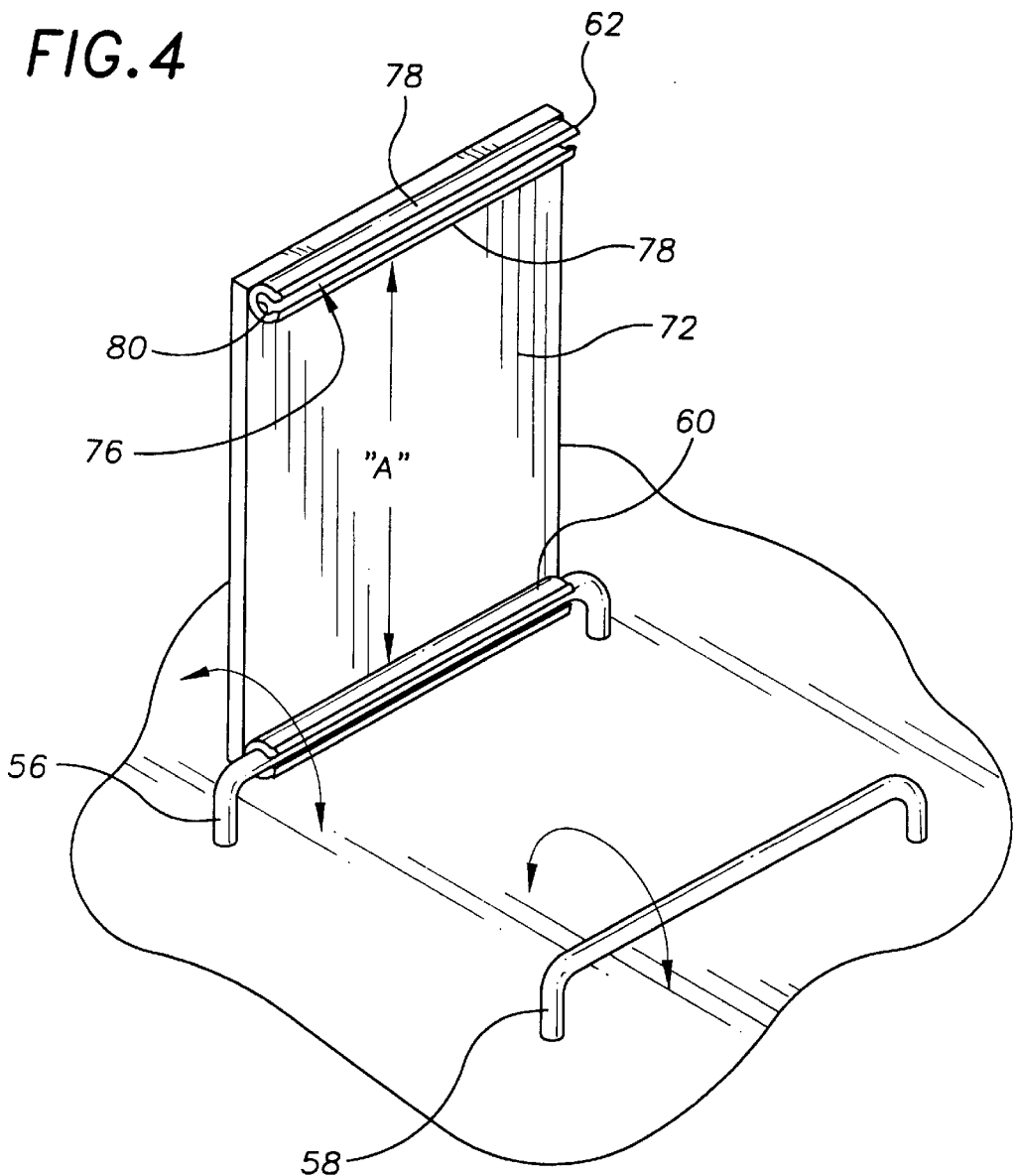
FIG. 4 is a detail perspective view of the two-sided, two-way pivoting mirror assembly in isolation showing the two-sided mirror pivoted upwardly about the first pivot bar, the second pivoting strip connector disconnected from the second pivoting bar revealing the pivoting bar insertion opening, and the inwardly directed mirror surface of the two sided mirror.

With reference now to FIG. 3, an end 46 of each of the nylon straps 40 is permanently attached to an underside surface 48 of main housing 12 by a rivet 50. Two-sided, two-way pivoting mirror assembly 14 includes a two-sided mirror 54; first and second pivot bars 56,58; first and second pivoting strip connectors 60,62; and first and second pull straps 64,66. Two-sided mirror 54 is a conventional double sided mirror having a first and a second mirrored surface 70,72. One or both of mirrored surfaces 70,72 can be magnified if desired. With reference to FIG. 4, in this embodiment, first and second pivoting strip connectors 60,62 are each permanently secured to the second mirrored surface 72 with a permanent adhesive. First and second pivoting strip connectors 60,62 are of identical molded plastic construction and each includes a pivot bar insertion opening 76 along the entire lengths thereof. Each pivot bar insertion opening 76 is defined between two resilient wall sections 78 that form a resilient pivot bar gripping structure 80. First and second pivoting strip connectors 60,62 are spaced apart a distance "A" that is sufficient to allow first pivot bar 56 to be positioned within the pivot bar gripping structure 80 of first pivoting strip connector 60 while second pivot bar 58 is positioned within the resilient pivot bar gripping structure 80 of second pivoting strip connector 62.

Figure 5:
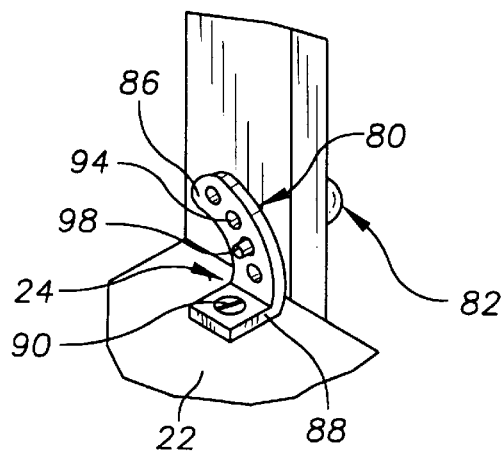
FIG. 5 is a detail perspective view of the tray member angular adjustment mechanism showing the multiple locking apertures provided through the curved portion of the curved locking bar of the tray member angular adjustment mechanism; the base portion of the curved locking bar secured to the tray member; and the locking pin assembly with the locking pin shaft positioned through the sidewall aperture of the main housing and through one of the locking apertures of the curved locking bar and the locking pin knob positioned exteriorly of the main housing compartment.

With reference to FIG. 5, tray member angular adjustment mechanism 24 includes a curved steel locking bar, generally designated 80 and a locking pin assembly, generally designated 82. Curved locking bar 80 includes a curved portion 86 and a base portion 88. Base portion 88 is secured to pivoting tray member 22 with a securing screw 90. Curved portion 86 extends away from tray member 22 and has multiple locking apertures 94 provided therethrough for receiving a tip end 98 of the locking pin shaft 100 (FIG. 6). With further reference to FIG. 6, locking pin shaft 100 is positioned through a sidewall aperture 104 of main housing 12 and is connected to a locking pin knob 106 that forms the remainder of locking pin assembly 82. In use, the angle of tray member 22 is adjustable to a desired angle by selecting and then inserting the tip end 98 of locking shaft 100 through the corresponding locking aperture 94 (FIG. 5).

It can be seen from the preceding description that a vehicle seatback tray assembly has been provided that includes a tray member that is storable in an upright position; that includes a user positionable mirror and a light source; that includes a pivoting tray member that is lockable at a variety of user selected angles; that includes a main tray assembly, a two-sided, two-way pivoting mirror assembly, two user formable, upper attachment hooks, and two adjustable length lower securing strap assemblies; and that includes a main tray assembly, a two-sided, two-way pivoting mirror assembly, two user formable, upper attachment hooks, and two adjustable length lower securing strap assemblies; the main tray assembly including a main housing, a pivoting tray member and a tray member angular adjustment mechanism; the main housing including a forward storage tray, a main housing compartment, a light compartment for housing a light bulb socket, and a light bulb socket controlling on/off switch; the pivoting tray member being pivotally connected to the main housing and including a light opening that pivots over the light compartment of the main housing when the pivoting tray member is pivoted into a closed position blocking access into the main housing compartment; the angular adjustment mechanism including a curved locking bar and a locking pin assembly; the curved locking bar having a base portion secured to the tray member and a curved portion extending away from the pivoting tray member that has a number of spaced locking apertures provided therethrough; the locking pin assembly including a locking pin shaft positioned through the sidewall aperture of the main housing that is concentrically alignable with each of the locking apertures by pivoting the pivoting tray member and a locking pin knob that is attached to an end of the locking pin shaft and positioned exteriorly of the main housing compartment; the two-sided, two-way pivoting mirror assembly being positioned within the main housing compartment and including a two-sided mirror, a first and a second pivot bar, a first and a second pivoting strip connector, and first and second pull straps; the first and the second pivot bar each being U-shaped and secured at the ends of thereof to a main housing compartment defining wall of the main housing; the first and second pivoting strip connectors each being permanently secured to an inwardly directed mirror surface of the two-sided mirror and each including a pivot bar insertion opening along the entire length thereof that is defined between two resilient wall sections that further define a resilient pivot bar gripping structure; the first and second pivoting strip connectors being spaced apart a distance sufficient to allow the first pivot bar to be positioned within the resilient pivot bar gripping structure of the first pivoting strip connector while the second pivot bar is positioned within the resilient pivot bar gripping structure of the second pivoting strip connector; each of the resilient pivot bar gripping structures having sufficient gripping strength against a respective pivot bar to independently hold the two-sided mirror in a user set pivot position; the two user formable, upper attachment hooks each being constructed from a user bendable metal strip and secured to the main tray assembly with a securing eye-bolt; the two adjustable length lower securing strap assemblies each including an adjustable length strap provided with an underseat attachment hook at one end thereof and permanently attached to the underside of the main housing at a second strap end thereof.

It is noted that the embodiment of the vehicle seatback tray assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle seatback tray assembly comprising:

a main tray assembly;

a two-sided, two-way pivoting mirror assembly;

two user formable, upper attachment hooks; and two adjustable length lower securing strap assemblies;

said main tray assembly including a main housing, a pivoting tray member and a tray member angular adjustment mechanism;

said main housing including a forward storage tray, a main housing compartment, a light compartment for housing a light bulb socket, and a light bulb socket controlling on/off switch;

said pivoting tray member being pivotally connected to said main housing and including a light opening that pivots over said light compartment of said main housing when said pivoting tray member is pivoted into a closed position blocking access into said main housing compartment;

said angular adjustment mechanism being connected between said pivoting tray member and said main housing;

said two-sided, two-way pivoting mirror assembly being positioned within said main housing compartment and including a two-sided mirror, a first and a second pivot bar, a first and a second pivoting strip connector, and first and second pull straps;

said first and said second pivot bar each being U-shaped and secured at ends of thereof to a main housing compartment defining wall of said main housing;

said first and second pivoting strip connectors each being permanently secured to an inwardly directed mirror surface of said two-sided mirror;

each of said first and second pivoting strip connectors including a pivot bar insertion opening along an entire length thereof that is defined between two resilient wall sections that further define a resilient pivot bar gripping structure;

said first and second pivoting strip connectors being spaced apart a distance sufficient to allow said first pivot bar to be positioned within said resilient pivot bar gripping structure of said first pivoting strip connector while said second pivot bar is positioned within said resilient pivot bar gripping structure of said second pivoting strip connector;

each of said resilient pivot bar gripping structures having sufficient gripping strength against a respective said pivot bar to independently hold said two-sided mirror in a user set pivot position;

each of said two user formable, upper attachment hooks being constructed from a user bendable strip and secured to said main tray assembly with a securing eye-bolt;

said two adjustable length lower securing strap assemblies each including an adjustable length strap provided with an underseat attachment hook at one end thereof and attached to said main housing at a second strap end thereof.

2. The vehicle seatback tray assembly of claim 1, wherein:

each of said two user formable, upper attachment hooks is constructed from a user bendable metal strip.

3. The vehicle seatback tray assembly of claim 2, wherein:

said first and second pivoting strip connectors are constructed from a plastic material.

4. The vehicle seatback tray assembly of claim 3 wherein:

said adjustable length strap of each of said two adjustable length lower securing strap assemblies is permanently attached to an underside of said main housing at said second strap end thereof.

5. The vehicle seatback tray assembly of claim 4 wherein:

said angular adjustment mechanism includes a curved locking bar and a locking pin assembly; said curved locking bar having a base portion secured to said tray member and a curved portion extending away from said pivoting tray member that has a number of spaced locking apertures provided therethrough; said locking pin assembly including a locking pin shaft and a locking pin knob, said locking pin shaft being positioned through a sidewall aperture of said main housing and that is concentrically alignable with each of said locking apertures by pivoting said pivoting tray member, said locking pin knob being attached to an end of said locking pin shaft and positioned exteriorly of said main housing compartment.

6. The vehicle seatback tray assembly of claim 3 wherein:

said angular adjustment mechanism includes a curved locking bar and a locking pin assembly; said curved locking bar having a base portion secured to said tray member and a curved portion extending away from said pivoting tray member that has a number of spaced locking apertures provided therethrough; said locking pin assembly including a locking pin shaft and a locking pin knob, said locking pin shaft being positioned through a sidewall aperture of said main housing and that is concentrically alignable with each of said locking apertures by pivoting said pivoting tray member, said locking pin knob being attached to an end of said locking pin shaft and positioned exteriorly of said main housing compartment.

7. The vehicle seatback tray assembly of claim 2 wherein:

said adjustable length strap of each of said two adjustable length lower securing strap assemblies is permanently attached to an underside of said main housing at said second strap end thereof.

8. The vehicle seatback tray assembly of claim 7 wherein:

said angular adjustment mechanism includes a curved locking bar and a locking pin assembly; said curved locking bar having a base portion secured to said tray member and a curved portion extending away from said pivoting tray member that has a number of spaced locking apertures provided therethrough; said locking pin assembly including a locking pin shaft and a locking pin knob, said locking pin shaft being positioned through a sidewall aperture of said main housing and that is concentrically alignable with each of said locking apertures by pivoting said pivoting tray member, said locking pin knob being attached to an end of said locking pin shaft and positioned exteriorly of said main housing compartment.

9. The vehicle seatback tray assembly of claim 2 wherein:

said angular adjustment mechanism includes a curved locking bar and a locking pin assembly; said curved locking bar having a base portion secured to said tray member and a curved portion extending away from said pivoting tray member that has a number of spaced locking apertures provided therethrough; said locking pin assembly including a locking pin shaft and a locking pin knob, said locking pin shaft being positioned through a sidewall aperture of said main housing and that is concentrically alignable with each of said locking apertures by pivoting said pivoting tray member, said locking pin knob being attached to an end of said locking pin shaft and positioned exteriorly of said main housing compartment.

10. The vehicle seatback tray assembly of claim 1, wherein:

said first and second pivoting strip connectors are constructed from a plastic material.

11. The vehicle seatback tray assembly of claim 10 wherein:

said adjustable length strap of each of said two adjustable length lower securing strap assemblies is permanently attached to an underside of said main housing at said second strap end thereof.

12. The vehicle seatback tray assembly of claim 11 wherein:

said angular adjustment mechanism includes a curved locking bar and a locking pin assembly; said curved locking bar having a base portion secured to said tray member and a curved portion extending away from said pivoting tray member that has a number of spaced locking apertures provided therethrough; said locking pin assembly including a locking pin shaft and a locking pin knob, said locking pin shaft being positioned through a sidewall aperture of said main housing and that is concentrically alignable with each of said locking apertures by pivoting said pivoting tray member, said locking pin knob being attached to an end of said locking pin shaft and positioned exteriorly of said main housing compartment.

13. The vehicle seatback tray assembly of claim 10 wherein:

said angular adjustment mechanism includes a curved locking bar and a locking pin assembly; said curved locking bar having a base portion secured to said tray member and a curved portion extending away from said pivoting tray member that has a number of spaced locking apertures provided therethrough; said locking pin assembly including a locking pin shaft and a locking pin knob, said locking pin shaft being positioned through a sidewall aperture of said main housing and that is concentrically alignable with each of said locking apertures by pivoting said pivoting tray member, said locking pin knob being attached to an end of said locking pin shaft and positioned exteriorly of said main housing compartment.

14. The vehicle seatback tray assembly of claim 1 wherein:

said adjustable length strap of each Of said two adjustable length lower securing strap assemblies is permanently attached to an underside of said main housing at said second strap end thereof.

15. The vehicle seatback tray assembly of claim 14 wherein:

said angular adjustment mechanism includes a curved locking bar and a locking pin assembly; said curved locking bar having a base portion secured to said tray member and a curved portion extending away from said pivoting tray member that has a number of spaced locking apertures provided therethrough; said locking pin assembly including a locking pin shaft and a locking pin knob, said locking pin shaft being positioned through a sidewall aperture of said main housing and that is concentrically alignable with each of said locking apertures by pivoting said pivoting tray member, said locking pin knob being attached to an end of said locking pin shaft and positioned exteriorly of said main housing compartment.

16. The vehicle seatback tray assembly of claim 1 wherein:

said angular adjustment mechanism includes a curved locking bar and a locking pin assembly; said curved locking bar having a base portion secured to said tray member and a curved portion extending away from said pivoting tray member that has a number of spaced locking apertures provided therethrough; said locking pin assembly including a locking pin shaft and a locking pin knob, said locking pin shaft being positioned through a sidewall aperture of said main housing and that is concentrically alignable with each of said locking apertures by pivoting said pivoting tray member, said locking pin knob being attached to an end of said locking pin shaft and positioned exteriorly of said main housing compartment.

* * * * *